United States Patent [19]

Aggarwal et al.

[11] Patent Number: 5,631,694
[45] Date of Patent: May 20, 1997

[54] MAXIMUM FACTOR SELECTION POLICY FOR BATCHING VOD REQUESTS

[75] Inventors: Charu C. Aggarwal, Cambridge, Mass.; Joel L. Wolf, Katonah; Philip S. L. Yu, Chappagua, both of N.Y.

[73] Assignee: IBM Corporation, Armonk, N.Y.

[21] Appl. No.: 595,313

[22] Filed: Feb. 1, 1996

[51] Int. Cl.[6] .................................................. H04N 7/173
[52] U.S. Cl. ................................. 348/7; 348/12; 455/4.2; 455/5.1
[58] Field of Search ................................ 348/7, 12, 13, 348/6, 1, 10; 455/2, 4.2, 5.1, 6.1, 6.2; 395/200.09; H04N 7/16, 7/173

[56] References Cited

U.S. PATENT DOCUMENTS

| | | | |
|---|---|---|---|
| 5,351,075 | 9/1994 | Herz et al. | 348/1 |
| 5,440,334 | 8/1995 | Walters et al. | 348/6 |
| 5,453,779 | 9/1995 | Dan et al. | 348/13 |
| 5,461,415 | 10/1995 | Wolf et al. | 348/7 |
| 5,508,732 | 4/1996 | Bottomley et al. | 348/12 |
| 5,561,456 | 10/1996 | Yu | 348/7 |

OTHER PUBLICATIONS

P. Yu et al., "Design and Analysis of a Look–Ahead Scheduling Scheme to Support Pause–Resume for Video–on–Demand Applications", *Multimedia Systems*, Springer–Verlag, 3: 137–149 (1995).

"11.6 Forecasting", Inventory Theory, pp. 522–526.

J. Wolf et al., "DASD Dancing: A Disk Load Balancing Optimization Scheme for Video–on–Demand Computer Systems", *ACM Sigmetrics*, Ottawa, Canada pp. 1–26, (1994).

H. Schachnai et al., "IBM Research Report – The Role of Wait Tolerance in Effective Batching: A Paradigm for Multimedia Scheduling Schemes", *IBM Research Division – Computer Science*, pp. 1–21, (Apr. 17, 1995).

*Primary Examiner*—John K. Peng
*Assistant Examiner*—Chris Grant
*Attorney, Agent, or Firm*—Ratner & Prestia

[57] ABSTRACT

A VOD scheduler maintains a queue of pending performance for each video. Using the notion of queue selection factor, a batching policy is devised that schedules the video with the highest selection factor. Selection factors are obtained by applying discriminatory weighting factors to the adjusted queue lengths associated with each video where the weight decreases as the popularity of the respective video increases and the queue length is adjusted to take defection into account.

17 Claims, 3 Drawing Sheets

MAXIMUM FACTOR SELECTION POLICY FOR BATCHING VOD REQUESTS

BACKGROUND OF THE INVENTION

1. Field of the Invention

The present invention relates the scheduling of performance requests in Video-On-Demand (VOD) systems.

2. Background of the Invention

In Video-on-Demand systems, popular videos (i.e. movies or other programs) are often requested by many viewers. In order to increase system throughput, some viewers requesting an identical video may be transmitted (and hence share) a single video stream. This is referred to in the art as "batching".

Depending upon the system load, a requested video may not be started immediately. While viewers will usually tolerate a small wait time, a long wait may result in the loss (or "defection") of viewers. This may be accomplished, for example, by the viewer indicating (either actively or passively) that he is no longer interested in viewing the requested video.

A conventional approach to video scheduling is the use of a first-come-first-serve (FCFS) policy. Under this policy, all video requests are placed in a single request queue. The request at the front of the queue is sewed when system capacity is available to service the request. If batching is supported, all subsequent queued requests for the same video as the serviced request are also serviced from the same signal stream.

An alternative to the above approach is to maintain a separate request queue for each video and to select the video with the longest queue for the next showing. This is referred to as the longest queue length first (LQF) policy. Still another approach is to provide periodic showing (say every 5 minutes) for the most popular videos. For requests which would not be serviced by periodic showings, another scheduling scheme such as FCFS can be used.

As mentioned above, a viewer with a waiting request may defect if the waiting time exceeds the viewer's tolerance. Viewer defection is, of course, undesirable. The choice of video scheduling policy can have a significant effect on the amount of batching and defection. The FCFS policy does not take into account the batch size. By contrast, the LQF policy ignores the wait time already incurred by the waiting requests. Periodic showing (when used alone) may not provide the flexibility needed to cope with dynamic load variations.

Recently, a new approach oil batching was proposed in Shachnai, H., and Yu, P., The Role of Wait Tolerance in Effective Batching: A Paradigm for Multimedia Scheduling Schemes, IBM Research Report RC 20038, Apr. 1995, which is incorporated herein by reference. Under this approach, the additional wait time that viewers will tolerate before defecting, in addition to a video's respective queue length, is considered in making scheduling decisions. When system capacities become available, rather than scheduling the video immediately, the scheduler delays transmission of the video until just prior to expiration of the maximum wait tolerance time of the longest waiting one of the pending transmission requests. In the interim, additional requests for transmission of the video may join the queue. In contrast with LQF, a video with the longest queue may not get scheduled if all waiting requests are fairly recent. This prevents the most popular videos from monopolizing the stream capacities. In contrast with FCFS, better batching is achieved. To effectively implement this algorithm, however, knowledge of viewer tolerance is required. This knowledge may not be readily available.

SUMMARY OF THE INVENTION

A VOD scheduler maintains a queue of pending performance for each video. Using the notion of queue selection factor, a batching policy is devised that schedules the video with the highest selection factor. Selection factors are obtained by applying discriminatory weighting factors to the adjusted queue lengths associated with each video where the weight decreases as the popularity of the respective video increases and the queue length is adjusted to take defection into account.

Two alternative means of obtaining queue selection factors are provided. The first approach, referred to as the steady state approach, is designed for quasi static or steady state environments where the relative request frequencies of the different videos changes very gradually (in terms of hours). The second approach, referred to as the instantaneous approach, is for a more dynamic environment where the relative request frequencies of the different videos change rapidly (in terms of minutes).

Under the steady state approach, the queue selection factor of a video is obtained by dividing the adjusted queue length of the video's associated queue by the square root of its relative request frequency. To account for the effect of detection, the queue length is adjusted by the number of defections. That is to say that the scheduler substitutes the queue length in the selection factor calculation by the number of requests for a video since the last time that it was scheduled. Thus, for example, if a large percentage of the viewers corresponding to unpopular videos defect anyway, then using the number of requests since last scheduling (instead of the queue length) increases the fairness of the system.

One way of estimating the relative frequency is to use a moving window estimate. This is obtained by counting, for each video, the number of requests which had occurred in a moving window of the immediate past (for example, a window of the past hour). Smoothing techniques can also be applied to take weighted averages over past estimates.

Since unpopular videos have respectively lower relative request frequencies, the square roots of the inverse of their relative frequencies are larger than those of the popular videos. Thus, the queue selection factors are obtained by applying discriminatory weighting factors to the adjusted queue lengths which serves as a bias against the more popular videos. This prevents popular videos from monopolizing all the stream capacities and forming frequent batches of small sizes (which is what occurs using the LQF policy).

Under the instantaneous approach, the queue selection factor of a video is obtained by multiplying its adjusted queue length by the time which has elapsed since the last scheduling of the video. Although unpopular videos have lower request frequencies or shorter queues, their selection factors will increase as the time elapsed since last scheduling increases. This again provides discriminatory weighting factors which disfavor the more popular videos.

DETAILED DESCRIPTION OF A PREFERRED EMBODIMENT

Figure 1:
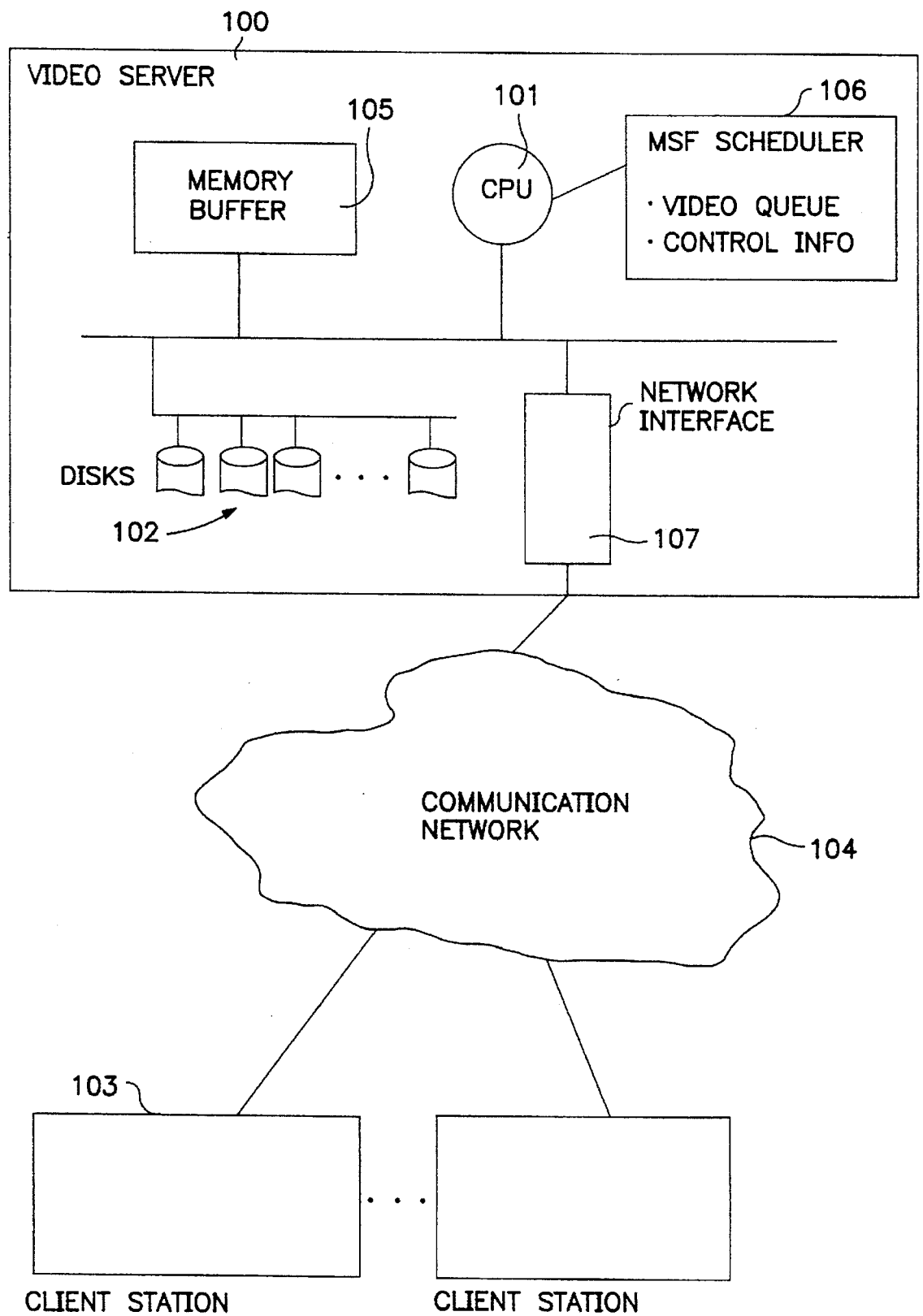
FIG. 1 is a block diagram of a multimedia server.

FIG. 1 is a block diagram of a video server 100 in which video data (movies or other moving visual or audio visual performances) is stored in disks 102 and is transmitted to the end client stations 103 over network 104 upon request. The video server 100 also includes disks (not shown) which store working data and the program code for the video server 100. Other storage devices such as video tape players and jukeboxes (from which movies can be loaded to disks 102) may be optionally included.

The program code for the video server 100 includes processes such as the server main control program, a video scheduling program, a customer usage tracking program, and conventional communications, I/O and buffer management processes. The video server 100 includes a processor (i.e. CPU) 101 which executes the processes under control of the main control program and a memory buffer 105 which is used for the temporary storage of portions of videos (thus enabling some users to be served from the memory buffer 105 rather than the disks 102). The memory buffer 105 call also be used to handle pause/resume requests by providing a temporary storage area tier portions of a video which stream from the disk while a viewer is paused. Other than the scheduler 106, the process may be of a conventional type typically used ill VOD systems and which is described, for example in Yu, P. et al., "Design and analysis of a look-ahead scheduling scheme to support pause-resume for video-on-demand applications", *Multimedia Systems*, (1995); and Wolf, J. et al., DASD Dancing: A Disk Load Balancing Optimization Scheme for Video-On-Demand Computer Systems "*ACM Sigmetrics*, Ottawa, Canada (1994).

The video server 100 may be embodied using any processor of sufficient performance for the number of video streams to be supported. For example, a small capacity video server may be embodied using a RISC System/6000 ™ system while a larger capacity server could be embodied using an ES/9000 ™ system (both available from International Business Machines Corporation of Armonk, N.Y.). This disk 102 may be any conventional disk or disk array. The communication network 104 may be, for example, a fiber optic network or a conventional bidirectional cable network. The client stations 103 may each be embodied as a set-top box.

The scheduler 106 performs a number of tasks which result in the scheduling of performances for requested videos. In accordance with an exemplary embodiment of the present invention, upon receiving video requests from the client station 103, the scheduler (maximum selection factor based) 106 enters each request into the appropriate video queue. It tracks the last scheduling time of each video, the number of defections since last scheduling, and the relative request frequency for each video.

Assume that there are N different videos and a separate queue is maintained for each video. Let qi be the queue length of the i-th video queue, di be the number of defections since last scheduling at the i-th video queue, $f_i$ be the relative request frequency of the i-th video, and $\delta t_i$ represents the time since last scheduling of video i.

The present invention employs the notion of queue selection factor and devises the MSF policy that schedules the video with the maximum selection factor. The queue selection factor is obtained by applying discriminatory weighting factors to the respective queue lengths of the different videos where the weighting decreases as the popularity of the video increases.

Two alternative means of obtaining queue selection factor are provided. The steady state approach is designed for a quasi static or steady state environment where the relative request frequencies of the different videos change very gradually (in terms of hours). The instantaneous approach is for a more dynamic environment where the relative request frequencies of the different videos can change rapidly (in terms of minutes).

Under the steady state approach, the queue selection factor of a video is obtained by dividing the adjusted queue length of a video's queue by the square root of the video's relative request frequency. The adjusted queue length of a video's queue is the number of requests since last scheduling, the queue length adjusted by the number of defections since last scheduling. $W_i$, the queue selection factor of the i-th video queue is obtained as follows:

$$w_i = \frac{q_i + d_i}{\sqrt{f_i}}$$

One method of estimating the relative request frequency is to use the moving window estimate which is obtained by counting the number of requests for each video which occur in a moving window of a past period (for example a window of the past hour). Smoothing techniques for forecasting can also be applied to take weighted average over past estimates (as described for example by F. Hiller and O. Lieberman in Operations Research, Second Edition (1974), Holden-day, pages 522–526).

Since unpopular videos have lower relative request frequencies, the square roots of the inverse of their relative frequencies are larger than those of the popular videos. Thus, the queue selection factors are obtained by applying discriminatory weighting factors to the adjusted queue lengths which disfavor against the more popular videos. This would prevent the popular videos from monopolizing all the stream capacities and forming frequent batches of small sizes (which is what occurs using the LQF policy).

Under the instantaneous approach the queue selection factor of a video is obtained by multiplying its adjusted queue length of the video's queue by the time elapsed since last scheduling of the video. This is expressed as:

$$W_i = (q_i + d_i)\delta t_i.$$

Although unpopular videos have lower request frequencies or shorter queues, their selection factors increase as the time elapsed since last scheduling increases. This again provides discriminatory weighting factors which disfavor the more popular videos.

The implication of the MSF scheduling policy on the fairness of the system compared to the LQF policy is next examined. Intuitively, the fairness of the system measures the variation in the quality of service provided across different videos. LQF is rather unfair to the unpopular videos, because the queue for a popular video tends to build up much faster than the queue for an unpopular video. Using the queue selection factor "evens out" the unfairness by favoring the unpopular videos. Thus, MSF is much fairer than the LQF policy.

Figure 2A:
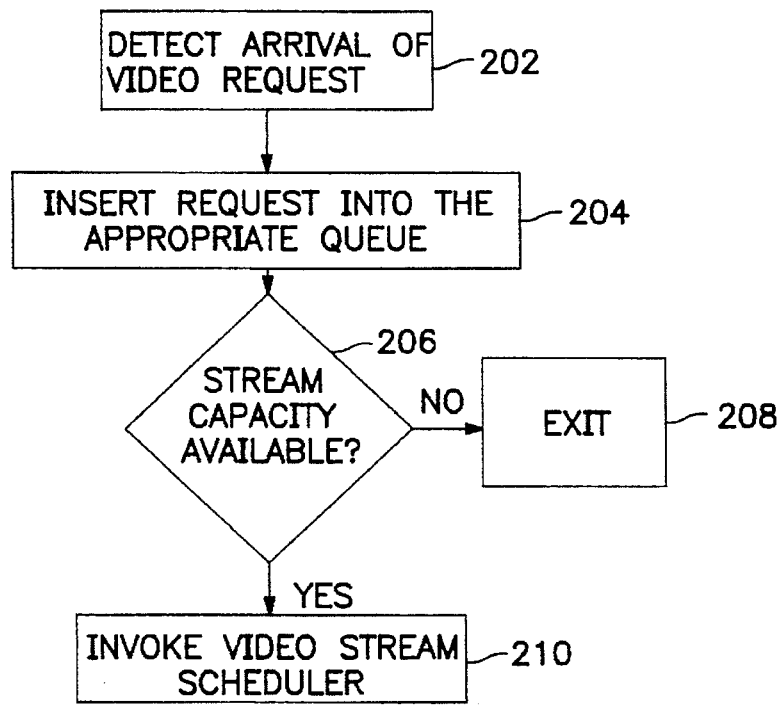
FIGS. 2A–2B are flow charts of events handled in the Maximum Selection Factor (MSF) scheduler.
Figure 2B:
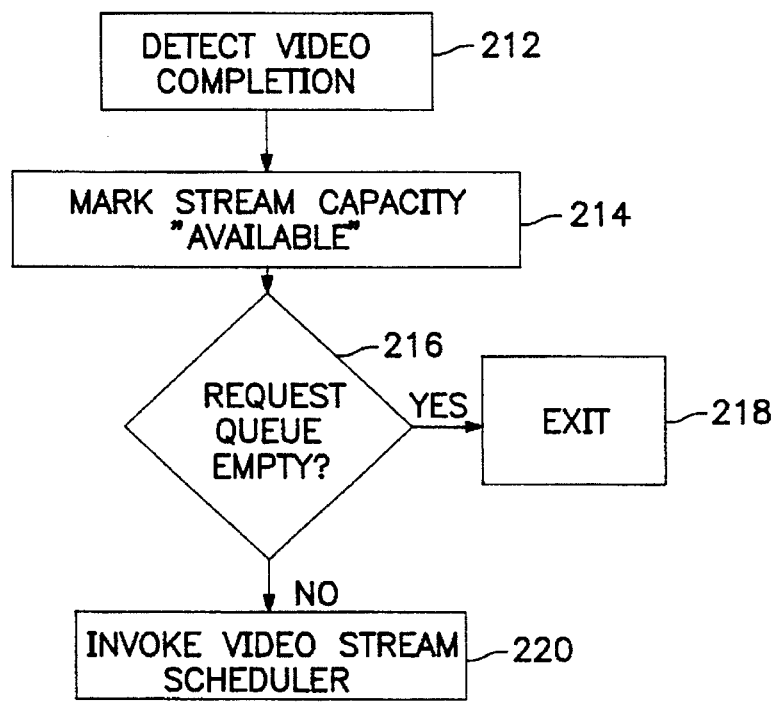

FIGS. 2A–2B are flow charts of events handled in the MSF schedule. Each of the tasks can execute in parallel for different requests. However, the video stream scheduler is desirably a serialization point. That is to say the video stream scheduler can be preferably invoked by only one task or event at a time and executes to completion once invoked.

FIG. 2A is a flow chart of video request handling by the MSF scheduler. Each time a new performance request for a video is made by a viewer, its arrival at the VOD system is detected by the scheduler at step 202. Next, at step 204, the scheduler determines the appropriate queue for the request based on the video requested and enters the request into the correct queue accordingly. Then, at step 206, the scheduler determines if there is any stream capacity available on the server. If there is no capacity available to service the request, the scheduler exits at step 208. At this point the request can not be scheduled until a currently running video completes and its associated stream capacity is freed. If the server has a stream capacity available, then at step 210 the scheduler invokes the video stream scheduling task of FIG. 3.

FIG. 2B is a flow chart of video completion handled by the MSF scheduler. Completion of a video is detected by the scheduler at step 212. A video can complete either by finishing the performance through its scheduled end time or by all of the viewers of the video exiting the video (terminating the performance). At step 214, the scheduler frees the stream capacity by marking it as being "available" (the use or available status of each stream capacity is conventionally tracked by the video server by way of a status table).

At step 2 16 the scheduler checks the request queues to determine if they are empty (i.e. there are no pending requests on any of the video queues). If the request queues are all empty, at step 218 the scheduler exits. Otherwise, if the request queues are not empty (there are waiting requests), at step 220 the scheduler invokes the video stream scheduling task of FIG. 3.

Figure 3:
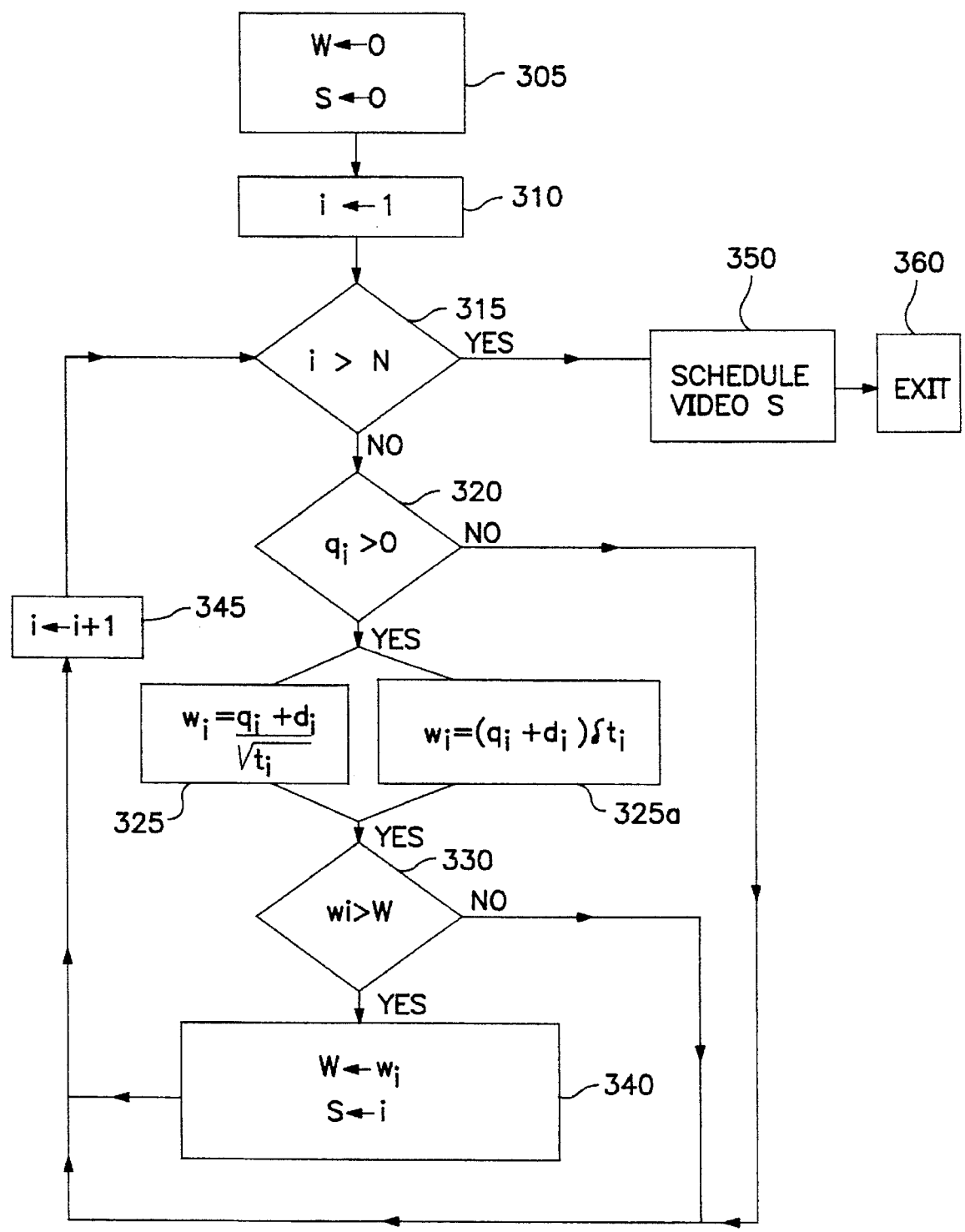
FIG. 3 is a flow chart of a video request handled by the MSF scheduler.

FIG. 3 is a flow chart of video requests handled by the MSF scheduler to calculate queue selection factor. The scheduler 106 is invoked when a stream becomes available or a new video request arrives. At step 305, W and S are set equal to zero, where W tracks the maximum selection factor among the video queues scanned and S tracks the corresponding index of the video queue. At step 310, i is initialized to 1, where i is the running index to scan through all video queues.

At step 315, the scheduler checks if the value of i is larger than the number N of video queues. This step is performed to determine whether all video queues have been examined. If not, the scheduler proceeds to step 320. At step 320, if $q_i$ is not zero, the queue selection factor ($w_i$) is calculated either at step 325 or 325a (depending on whether the steady state approach or the instantaneous approach is used). At step 330, wi is compared to W. If $W_i$ is larger, at step 340 the scheduler resets the value of W to track the largest queue selection factor scanned so far and also S to indicate that the i-th video queue has the largest queue selection factor among the first i video queues. At step 345, i is incremented by 1. Step 315 is then performed.

In accordance with the description of step 315 set forth above, if the value of i is larger than N, then all video queues have been examined. At step 350, the scheduler selects video S to schedule and then exits at step 360.

While the invention has been described in terms of exemplary embodiments, it is contemplated that it may be practical as outlined above with modifications within the spirit and scope of the appended claims.

What is claimed:

1. A method of scheduling a plurality of video requests, comprising the steps of:
 a) placing each of said plurality of video requests into a respective corresponding queue;
 b) determining a queue selection factor for each queue based on length of each queue and defections in each queue; and
 c) scheduling one of said plurality of video requests based on said queue selection factor of each of said queues.

2. A method of scheduling a plurality of video requests according to claim 1, wherein said queue selection factor is based on video request frequency of each of said plurality of video requests.

3. A method of scheduling a plurality of video requests according to claim 1, wherein said queue selection factor is based on time since last scheduling in said respective corresponding queue.

4. A method of scheduling a plurality of video requests according to claim 2, wherein said one of said plurality of video requests is scheduled having a largest queue selection factor.

5. A method of scheduling a plurality of video requests according to claim 3, wherein said one of said plurality of video requests is scheduled having a largest queue selection factor.

6. A method of scheduling a plurality of video requests according to claim 2, wherein for queue i:

$q_i$=queue length
 $d_i$=defections since last scheduling
 $f_i$=relative request frequency.
 and the queue selection factor is:

$$\frac{q_i + d_i}{\sqrt{f_i}}.$$

7. A method of scheduling a plurality of video requests according to claim 3, wherein for queue i:

$q_i$=queue length
 $d_i$=defections since last scheduling
 $\delta t_i$=time since last scheduling
 and the queue selection factor is:

$$(q_i+d_i)\delta t_i.$$

8. A method of scheduling a plurality of video requests according to claim 2, wherein scheduling occurs when a request is made or when a communications channel becomes available to transmit a video signal corresponding to a respective one of said video requests.

9. A method of scheduling a plurality of video requests according to claim 3, wherein scheduling occurs when a request is made or when a communications channel becomes available to transmit a video signal corresponding to a respective one of said video requests.

10. Video apparatus for scheduling a plurality of video requests, comprising:
 means for receiving a plurality of video requests and for maintaining a plurality of queues, each of said queues storing common ones of said requests
 means for determining a queue selection factor for each queue based on length of each queue and defections in each queue; and
 means for scheduling one of said plurality of video requests based on said queue selection factor of each of said queues.

11. Apparatus for scheduling a plurality of video requests according to claim 10 wherein said queue selection factor is based on video request frequency of each of said plurality of video requests.

12. Apparatus for scheduling a plurality of video requests according to claim 10 wherein said queue selection factor is based on time since last scheduling in said respective corresponding queue.

13. Apparatus for scheduling a plurality of video requests according to claim 11 wherein said one of said plurality of video requests is scheduled having a largest queue selection factor.

14. Apparatus for scheduling a plurality of video requests according to claim 11, wherein for queue i:

$q_i$=queue length $d_i$=defections since last scheduling $f_i$=relative request frequency and the queue selection factor is:

$$\frac{q_i+d_i}{\sqrt{f_i}}.$$

15. Apparatus for scheduling a plurality of video requests according to claim 12, wherein for queue i:

$q_i$=queue length $d_i$=defections since last scheduling $\delta t_i$=time since last scheduling and the queue selection factor is:

$$(q_i+d_i)\delta t_i.$$

16. Apparatus for scheduling a plurality of video requests according to claim 11, wherein scheduling occurs when a request is made or when a communications channel becomes available to transmit a video signal corresponding to a respective one of said video requests.

17. A method of scheduling a plurality of video requests according to claim 12, wherein scheduling occurs when a request is made or when a communications channel becomes available to transmit a video signal corresponding to a respective one of said video requests.

* * * * *

UNITED STATES PATENT AND TRADEMARK OFFICE
CERTIFICATE OF CORRECTION

PATENT NO. : 5,631,694
DATED : May 20, 1997
INVENTOR(S) : Aggarwal et al.

It is certified that error appears in the above-indentified patent and that said Letters Patent is hereby corrected as shown below:

Cover page, item [73] Assignee, delete "IBM Corporation" and insert --International Business Machines Corporation--.

Column 1, line 26, delete "sewed" and insert --served--.

Column 3, line 21, delete "call" and insert --can--.

Column 3, line 23, delete "tier' and insert --for--.

Column 3, line 40, delete "army" and insert --array--.

Column 3, line 56, delete "qi" and insert --$q_i$--.

Column 3, line 57, delete "di" and insert --$d_i$--.

Signed and Sealed this

Twenty-eighth Day of October, 1997

Attest:

BRUCE LEHMAN

*Attesting Officer*  *Commissioner of Patents and Trademarks*